(12) United States Patent
Kramer

(10) Patent No.: US 6,981,706 B1
(45) Date of Patent: Jan. 3, 2006

(54) SLIDING RECREATIONAL DEVICE

(75) Inventor: Detlef Kramer, Lompoc, CA (US)

(73) Assignee: Duke Technologies, Inc., Reno, NV (US)

( * ) Notice: Subject to any disclaimer, the term of this patent is extended or adjusted under 35 U.S.C. 154(b) by 148 days.

(21) Appl. No.: 10/440,904

(22) Filed: May 19, 2003

Related U.S. Application Data

(60) Provisional application No. 60/410,438, filed on Sep. 16, 2002.

(51) Int. Cl.
 *B62B 17/00* (2006.01)
(52) U.S. Cl. .................................... 280/21.1; 280/18.1
(58) Field of Classification Search .............. 280/18.1, 280/21.1, 28.11, 845, 19, 16, 14.27, 14.28; 441/40, 67
See application file for complete search history.

(56) References Cited

U.S. PATENT DOCUMENTS

| | | | |
|---|---|---|---|
| 2,876,467 A * | 3/1959 | Lund ........................... 441/40 |
| 3,080,584 A * | 3/1963 | Brown ......................... 441/67 |
| 3,455,571 A | 7/1969 | Dallera et al. | |
| 3,581,328 A * | 6/1971 | Smith .......................... 441/67 |
| 3,628,206 A * | 12/1971 | Mecham .................... 280/18.1 |
| 3,632,124 A * | 1/1972 | Cropp ........................ 280/845 |
| 3,749,399 A * | 7/1973 | Fedor et al. ............... 280/18.1 |
| 3,871,042 A * | 3/1975 | Farmer ...................... 280/18.1 |
| 3,901,526 A * | 8/1975 | Scott et al. ................. 280/18.1 |
| 4,366,963 A * | 1/1983 | Reeves et al. ............. 280/18.1 |
| 4,732,399 A | 3/1988 | Reilly et al. | |
| 5,149,117 A * | 9/1992 | Wilkens et al. ............ 280/18.1 |
| 5,893,579 A | 4/1999 | Kimura et al. | |
| 6,331,128 B1 | 12/2001 | Schmick | |
| 6,655,701 B2 * | 12/2003 | Oberpriller ................ 280/21.1 |

* cited by examiner

*Primary Examiner*—Hau Phan
(74) *Attorney, Agent, or Firm*—Richard S Erbe

(57) ABSTRACT

A sliding recreational device having a body, a seating area for a passenger, and a sliding pan mounted on the bottom of the body is disclosed. A cushioning element mounted in the body protects a passenger from injury while riding the device. By applying certain patterns to the bottom of the sliding pan, a stable, more predictable ride path is made possible for the rider. The addition of a system of pivoting braking elements and cabling enable a passenger to steer and brake the device.

6 Claims, 5 Drawing Sheets

SLIDING RECREATIONAL DEVICE

RELATED APPLICATIONS

This application claims the benefit of U.S. Provisional Pat. Application No. 60/410,438 filed Sep. 16, 2002, incorporated herein by reference.

BACKGROUND OF THE INVENTION

1. Field of the Invention

This invention relates to recreational devices that can be used to slide on snow, ice, grass, or sand. More particularly, the invention relates to a sliding recreational device or sled that provides protection against injury, directional stability, and is capable of being steered and braked by a passenger riding the on a slippery surface.

2. General Background and State of the Art

Devices that enable a person or persons to slide down a slippery surface have been known for many years, particularly devices that allow individuals to slide along snowy surfaces. Such devices are many and varied and include some well-known items such as a piece of cardboard, the so-called "flying saucer", sleds, toboggans, inner tubes, snowboards, and skis, to name a few. Some are quite simple, while others, such as skis and snowboards, are expensive and complex and require time and practice to perfect their use. They offer varying degrees of comfort, safety, and maneuverability. Some of the shortcomings of the cardboard, flying saucer, sled, inner tube and toboggan include the lack of cushioning elements to help prevent injury to riders and the lack of the ability to slow or stop them. Many of the aforementioned devices could only be stopped by a collision or a loss of momentum, such as when a sloped surface flattens out for a long stretch. A rider would have to risk injury by using his or her hands, feet, arms, and legs to slow down or stop the device otherwise. Also, most of the aforementioned devices have no structures to help stabilize the path traveled by the device and thus the passenger is exposed to the risk that he or she might suddenly veer off line into danger. Some other devices that are also of some relevance to the present invention will be described here.

U.S. Pat. No. 3,455,571 to Dallera, et al., discloses an inflatable sled for use on snow having two separate inflatable structures and two runners mounted on the bottom. It also includes valving to regulate the amount of air between the two bodies and means to rigidly secure the two structures together. The use of separate structures and the requirement for balancing the air between the two structures adds complexity and expense to the device. Dallera, et al., does not disclose a sliding recreational device that uses a separate cushioning structure or has a means of steering or braking the device.

U.S. Pat. No. 4,732,399 to Reilly, et al., discloses a sliding toy for use on snow or in water that is comprised of at least one inflatable tube and a covering which surrounds and encloses the tube. A passenger sits on top of the covering and slides down a hill while holding onto some handles attached to the covering. Reilly, et al., does not disclose a sliding recreational device that incorporates a separate cushioning member, nor does it provide for any way to stabilize, steer or brake the device by a passenger.

U.S. Pat. No. 5,893,570 to Kehrmann discloses a relatively flat, circular fabric coated sled that has a raised cushioned seat in its center for sliding on a snow or ice covered hill. A passenger sits on top of the cushioned seat and slides down a snow-covered hill whild holding onto handles that are attached to the fabric. Kehrmann does not disclose a sliding recreational device that incorporates any means of stabilizing, steering, or braking the device by the passenger.

U.S. Pat. No. 6,331,128 to Schmick discloses a recreational device that uses an enhanced inner tube that is filled with a material so that the inner tube never needs to be inflated. The purpose of the Schmick invention is to overcome problems with deterioration inherent in inner tubes due to UV exposure and tearing hazards. Schmick does not disclose a recreational sliding device having a separate cushioning structure or a means to stabilize, steer or brake the device by a passenger.

A product called the Moore 42XB (also called "Snow Tube") is currently being sold on the market. This device basically consists of a standard inner tube covered by a fabric. It is designed so that a passenger sits in the middle of the hole in the inner tube to slide down a snowy hill. The Moore 42XB does not disclose a sliding recreational device that has a separate cushioning structure to reduce the possibilities of injury to the passenger, nor does it disclose any means of stabilizing, steering, or braking the device by the passenger.

None of the prior art references suggest the use of a cushioning feature in combination with a recreational sliding device having a passenger occupancy area formed by a single structure body of the sliding device.

None of the prior art references suggest the use of directional or rotational stabilizing elements in combination with a recreational sliding device having a passenger occupancy area formed by a single structure body of the sliding device.

None of the prior art references suggest the use of a separate sliding element in combination with a recreational sliding device having a passenger occupancy area formed by a single structure body of the sliding device.

None of the prior art references suggest the use of a steering mechanism in combination with a recreational sliding device having a passenger occupancy area formed by a single structure body of the sliding device.

None of the prior are reverences suggest the use of a braking mechanism in combination with a recreational sliding device having a passenger occupancy area formed by a single structure body of the sliding device.

There is no recreational sliding device incorporating a single body structure, a separate sliding surface, a passenger cushioning element, and a directional or rotational stabilizing structure.

There is no recreational sliding device incorporating a single body structure, a separate sliding surface, a passenger cushioning element, and a steering/braking mechanism.

None of the above patents or products, taken singularly or in combination, is seen to describe the present invention as disclosed and claimed.

SUMMARY OF THE INVENTION

Accordingly, it is an object of the invention to provide a recreational sliding device that incorporates a passenger cushioning element into a passenger occupancy area formed by the body of the device.

Another object of the invention is to provide a recreational sliding device that incorporates a separate sliding surface attached to the body of the device.

A further object of the invention is to provide a recreational sliding device that provides stabilizing means incorporated into the separate sliding surface of the device.

An additional object of the invention is to provide a recreational sliding device that incorporates a steering and braking mechanism into the device.

Still a further object of the invention is to provide a recreational sliding device that can easily be steered and braked by a passenger without requiring the passenger to expose his or her arms, legs, feet, and/or hands to injury.

Another object of the invention is to provide a recreational sliding device that is easy to build from readily available parts.

Still another object of the invention is to provide a recreational sliding device that is durable and easy to transport.

These and other objectives are achieved by the present invention, which, in a broad aspect, provides the user with a safe, fun, comfortable, reliable, stable, steerable, and brakable recreational sliding device that is durable and easy to fabricate and use.

A device according to a preferred embodiment of the present invention provides a recreational sliding device comprising a body that is generally annular in shape and forms an area that is suitable for a passenger to occupy. A sliding pan is positioned at the bottom of the sliding device and a seating platform is positioned on top of the passenger occupancy area. Prior to securing the seating platform and the sliding pan to the body, a cushioning element is mounted inside the passenger occupancy area. Straps are extended between the seating platform and the sliding pan along the outer surface of the body to securely hold the sliding pan and the seating platform in place. A passenger sits or lays on the seating platform after maneuvering the device to the top of a snow-covered hill, for example, and pushes off to begin the ride. The passenger use the attachment straps as handholds, or the sliding device can be provided with a number of handles mounted on the body to help hold the passenger on the device during the ride.

The lower side of the sliding pan (the side facing away from the body) can be configured in a number of ways. A plain, curving surface on the lower side of the sliding will provide a fun experience for a passenger, but the path traveled by the device may prove to be unpredictable. By providing rounded grooves, corrugations, or striations on the lower side of the sliding pan, a more stable, but still fun, ride may be experienced. The pattern on the lower side of the sliding pan will tend to make the device travel on a straighter path and also reduce the tendency of the device to spin.

In another embodiment of the device, a steering and braking system can be incorporated into the sliding device to enhance its safety and versatility. In the present invention, steering and braking are made possible by mounting a number of pivoting paddles on the lower face of the sliding pan. At the start of the ride, these paddles are positioned against the lower face of the sliding pan. The paddles are connected by cables to control levers (much like the control levers used for braking on a bicycle) that are mounted adjacent to the handles. By applying gripping pressure to one of the control levers, the paddle that is operatively connected to that control lever is lowered and causes drag to one side of the sliding device. This drag force will cause the device to turn in the direction of that paddle.

In one embodiment of the invention, two braking paddles are provided, one on the right side and one on the left side of the device. Corresponding control levers are mounted 180 degrees from each other on the body adjacent to two handles. When the passenger wants the device to turn to the right as it is traveling down a slope, applying a gripping force to the control lever on the passenger's right will cause the paddle on the bottom right of the sliding pan to extend away from the sliding pan and cause a dragging force on that side. This action makes the device turn to the right. By changing the intensity and duration of the gripping force, a small or large adjustment to the ride path can be made by the passenger. For a left turn, the control lever on the passenger's left side is operated in a manner similar to that for making a right turn.

The same mechanism that allows the passenger to make right or left turns as he or she is riding down a slope also allows the passenger to slow or stop the device. In the embodiment of the invention described above incorporating two control levers, simultaneous application of equal gripping pressure to both the right and left gripping levers will cause both of the paddles to extend and the resulting drag force will be equally applied, thus slowing the device. Continuous gripping pressure applied to the control levers will allow the passenger to bring the device to a stop.

Further objects and advantages of the present invention will become more apparent from the following description of the preferred embodiments, which, taken in conjunction with the accompanying drawings, will illustrate, by way of example, the principles of the invention.

DETAILED DESCRIPTION OF THE PREFERRED EMBODIMENTS OF THE INVENTION

In the following description of the present invention, reference is made to the accompanying drawings, which form a part thereof, and in which are shown, by way of illustration, exemplary embodiments illustrating the principles of the present invention and how it may be practiced.

It is to be understood that other embodiments may be utilized to practice the present invention and structural and functional changes may be made thereto without departing from the scope of the present invention.

Figure 1:
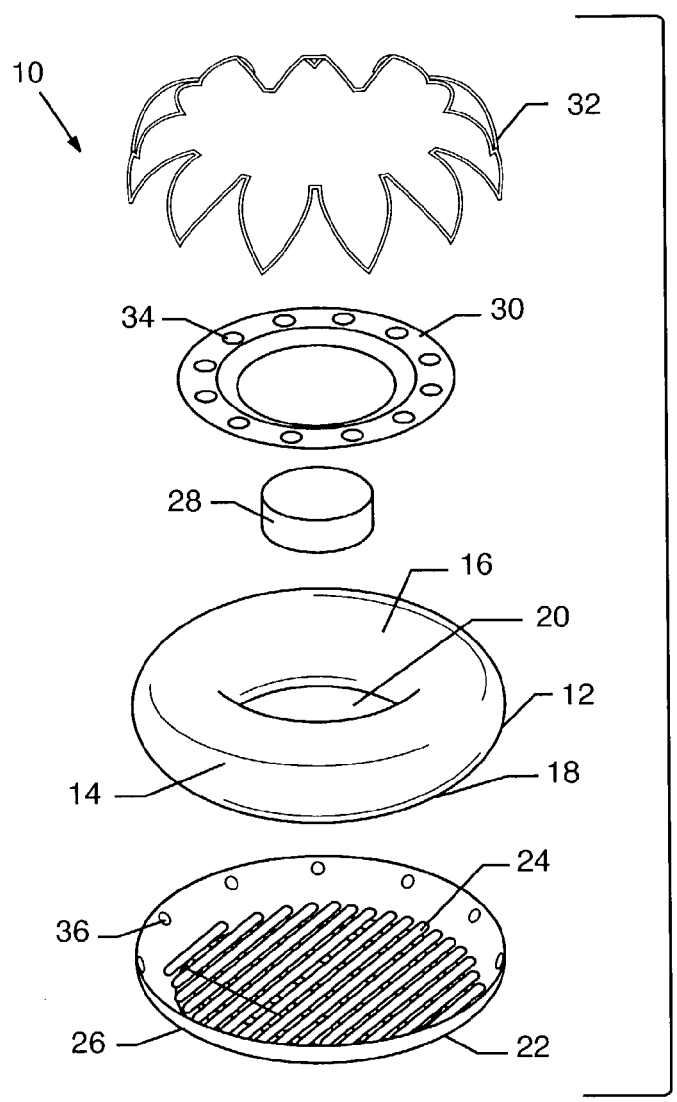
FIG. 1 illustrates an exploded perspective view of an exemplary device according to the present invention.
Figure 2:
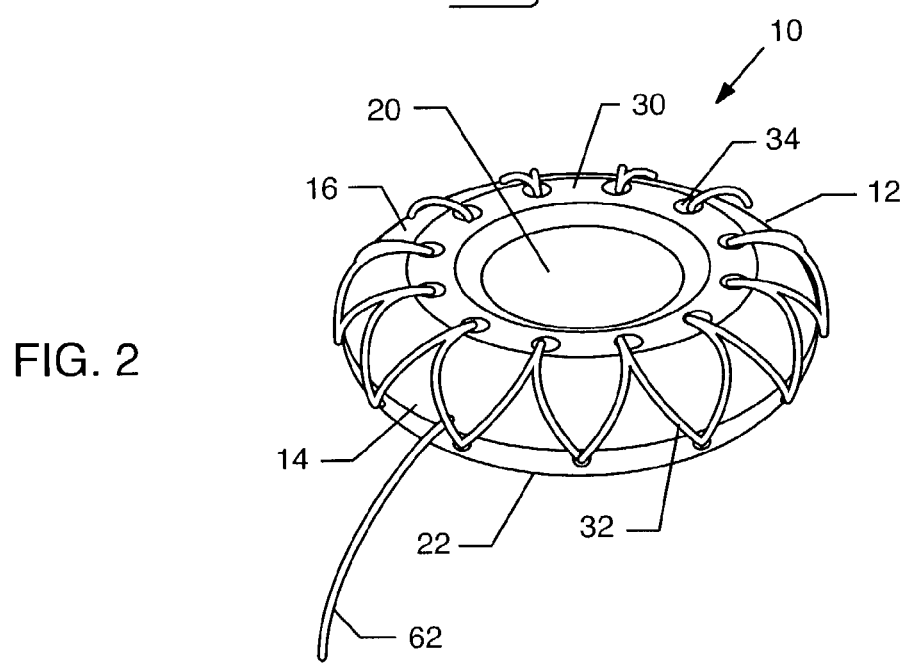
FIG. 2 illustrates a perspective view of an exemplary device according to the present invention.
Figure 3:
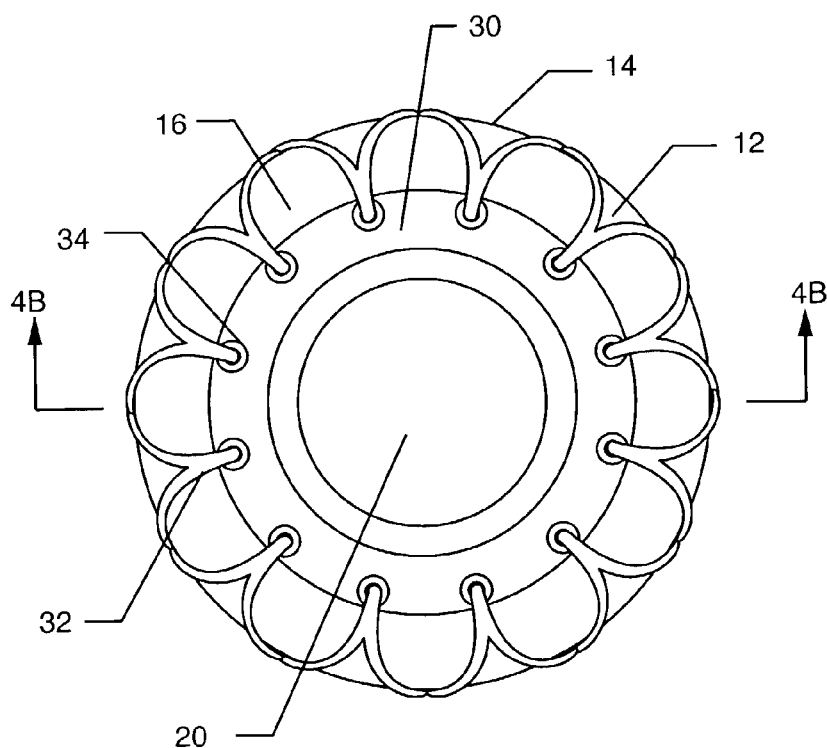
FIG. 3 illustrates a top view of an exemplary device according to the present invention.
Figure 4A:
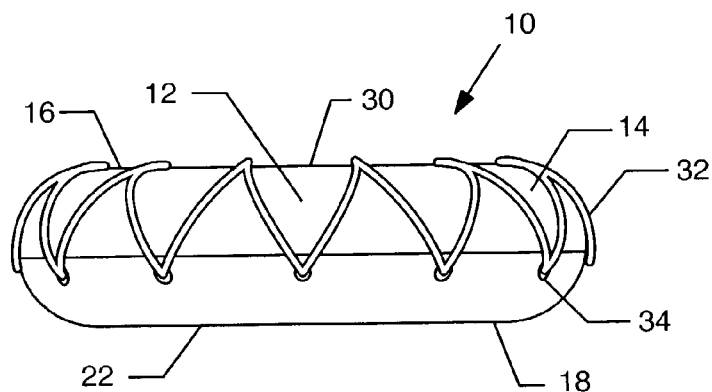
FIG. 4A illustrates a side view of an exemplary device according to the present invention.
Figure 4B:
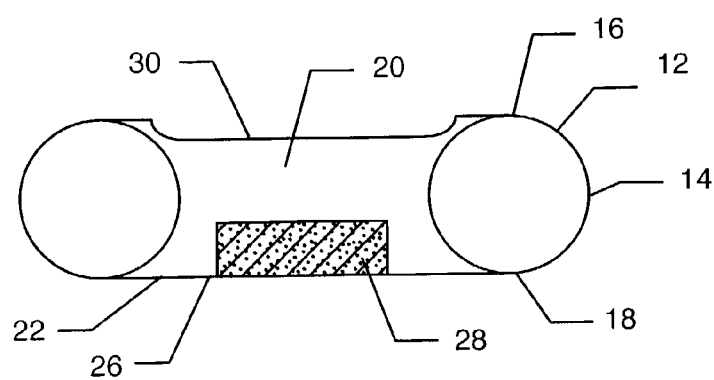
FIG. 4B illustrates a sectional side view taken along line 4B—4B in FIG. 3 of an exemplary device according to the present invention.
Figure 5:
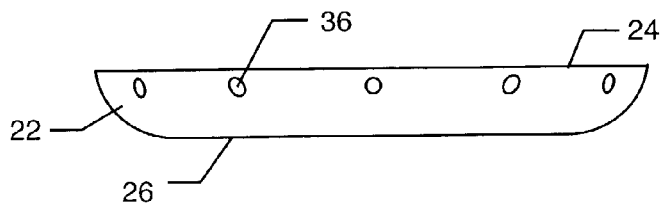
FIG. 5 illustrates a side view of the sliding pan of the present invention showing a plain rounded surface in the bottom face of the sliding pan.

A sliding recreational device, or sled, is embodied in an assembly generally referred to by the reference numeral 10 (FIGS. 1 and 2). A body 12 includes a perimeter 14, surface 16 and bottom surface 18. In the preferred embodiment of the invention, the body is generally annular in shape, such as a common inflatable inner tube, such as a 48" diameter inner tube produced by International Tire and Tube of Houston, Tex. It will be appreciated by those skilled in the art that body 12 could take on a variety of configurations comprised of straight and curving shapes, without departing from the scope of the present invention. The body forms a passenger occupancy area 20, in which is attached a high density foam cushion 28 to protect passenger 64 from lower spinal injuries.

Body 12 is fitted into a pan-shaped sliding pan 22 at bottom surface 18. The sliding pan 22 is preferably constructed of lightweight plastic or metal. Sliding pan 22 has top face 24 which abuts bottom surface 18. In the preferred embodiment of the invention, cushion 28 is glued to top face 24 of sliding pan 22. In embodiments where passenger occupancy area 20 does not extend completely through body 12, cushion 28 may be attached to body 12 within passenger occupancy area 20.

Figure 6:
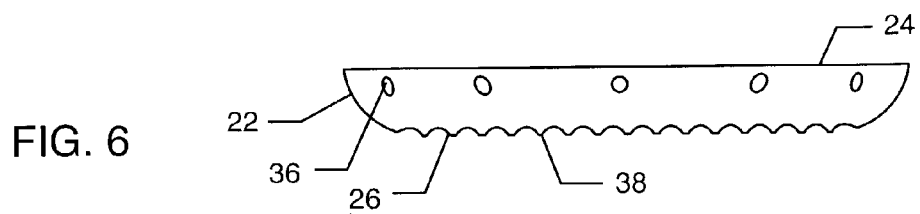
FIG. 6 illustrates an alternate side view of the sliding pan to the present invention showing rounded corrugations in the bottom face of the sliding pan.
Figure 7:
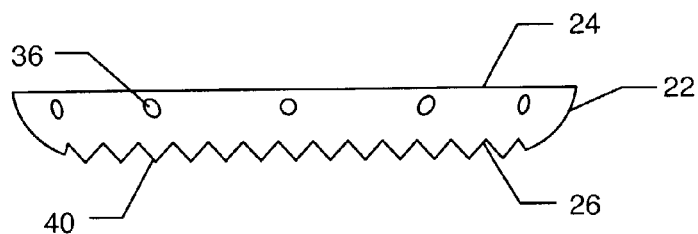
FIG. 7 illustrates an alternate side view of the sliding pan of the present invention showing zig-zag corrugations in the bottom face of the sliding pan.
Figure 8:
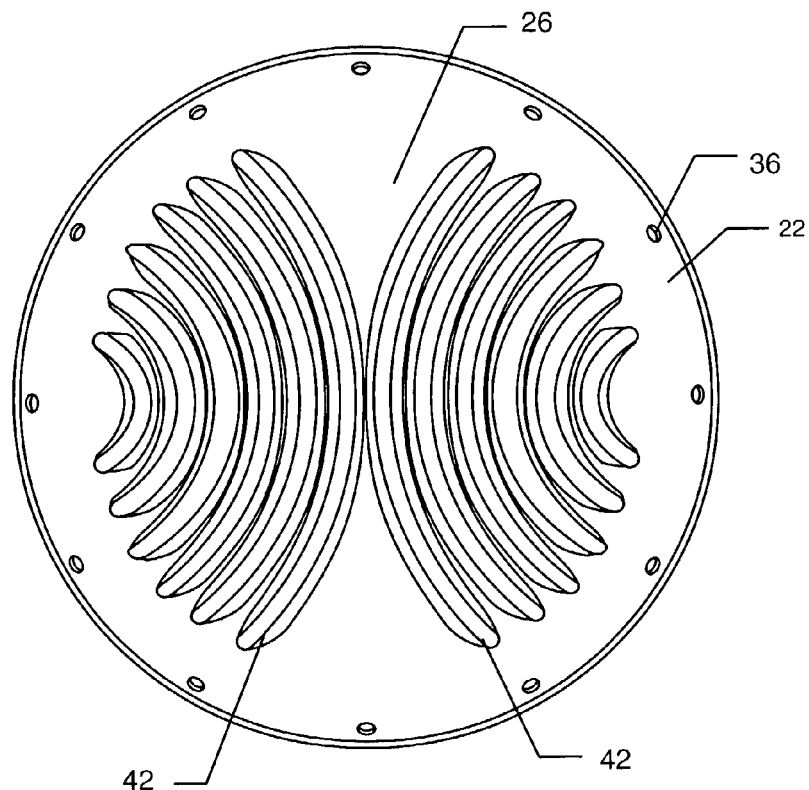
FIG. 8 illustrates an alternate side view of the sliding pan of the present invention showing a pattern of opposed striations in the bottom face of the sliding pan.

Bottom face 26 of sliding pan 22 may take on a number of configurations. It may be smooth or contain a pattern to provide directional stability for sled 10 while in use. FIG. 6 illustrates rounded grooves 38 on bottom face 26. FIG. 7 shows a pattern of corrugations 40 on bottom face 26 as an alternative pattern. Bottom face 26 may alternatively contain a pattern of opposed striations 46 as shown in FIG. 8. Any of these configurations will enable sled 10 to achieve directional and rotational stability while in use, as they act as runners in snow to reduce the tendency of the sled to spin.

Seating platform 30 is a fabric seat mounted on top surface 18. Seating platform 30 is preferably a soft cross-linked polyolefin manufactured by Stanlar Engineering of Bloomfield, New Jersey. Seating platform 30 has a dimpled area formed in the seat surface to keep a passenger from sliding off of sled 10 when in use. Seating platform 30 also contains a plurality of holes in a diametral pattern fitted with metal or plastic grommets 34 for purposes of securing seating platform 30 to body 12. Sliding pan 22 has a pattern of holes fitted with grommets 36 identical to grommets 34 of seating platform 30 for the same purpose. In the preferred embodiment, grommets 34 and 36 are ¾" diameter grommets produced by McMaster-Carr. A single water-resistant strap 32 is looped through grommets 34 and 36 to tightly secure seating platform 30 and sliding pan 22 to body 12. While the preferred embodiment of the invention utilizes a single continuous strap 32, it will be appreciated that a number of shorter straps could be used to achieve the same purpose. Strap 32 could also be used by passenger 64 as handles to further secure him or her to sled 10 while it is in use. Strap 32 could also serve as a means of towing sled 10 when not in use, or tow rope 62, as shown in FIG. 2, could be used for the same purpose.

The embodiment of the invention described heretofore provides a passenger with a unique experience. Ride stability and passenger safety are enhanced by several features incorporated in the present invention. A second embodiment of the invention adds the ability to steer and brake the device, features also not found in prior art sliding recreational devices.

Figure 9:
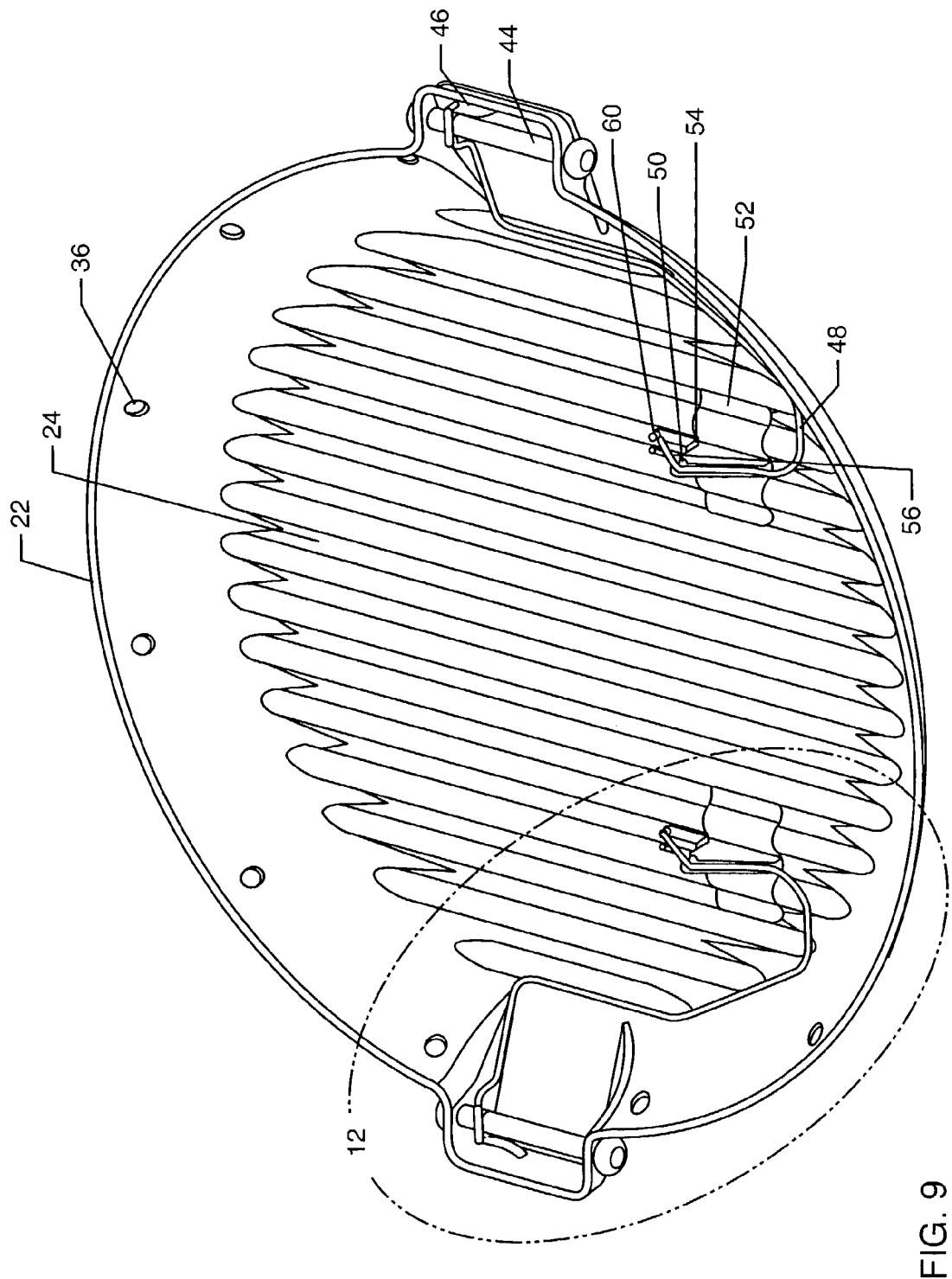
FIG. 9 illustrates a perspective view of the sliding pan of the present invention showing the steering and braking system.
Figure 10:
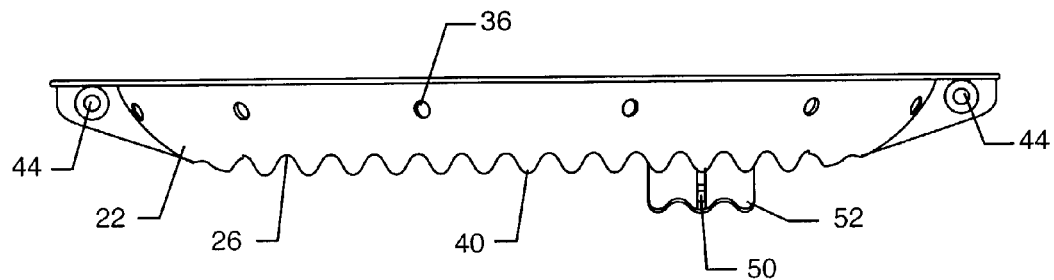
FIG. 10 illustrates a perspective view of the sliding pan of the present invention showing a paddle extended in the steering mode.
Figure 11:
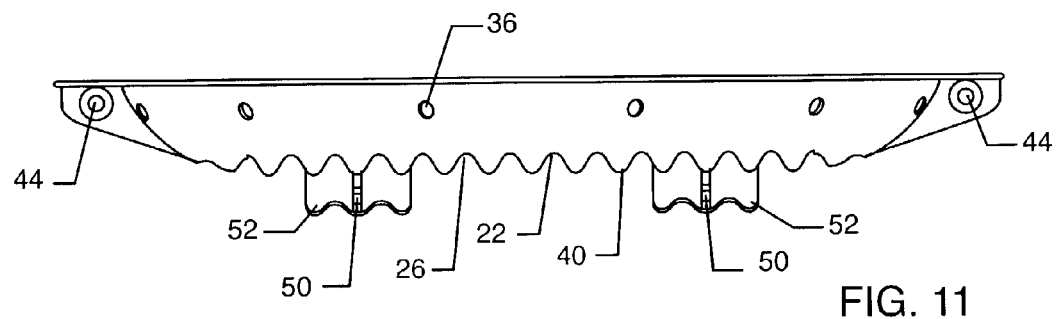
FIG. 11 illustrates a side view of the sliding pan of the present invention showing multiple paddles extended in the braking mode.

FIGS. 9–12 illustrate the mechanism incorporated in the present invention. It will be apparent to those skilled in the art that other configurations for steering and braking of the device are possible without departing from the scope of the present invention. Paddles 52 mounted on sliding pan 22 provide passenger 64 with the ability to steer and brake sled 10. In the present invention, I have shown two paddles spaced apart towards the rear of sliding pan 22, although sled 10 could be configured with more than two paddles, without departing from the scope of my invention. In their stowed position, paddles 52 rest against sliding pan 22. Passenger 56 operates paddles 52 for steering and braking by gripping one or both control levers 46 which are located adjacent to handles 44 on body 12. Control levers 46 operate in a manner similar to braking levers found on many bicycles. In the present embodiment of the invention, handles 44 are located 180 degrees from each other. Control levers 46 are operatively connected by cables 48 to paddles 52, as illustrated in FIG. 9. By applying gripping pressure to either or both of control levers 46, passenger 56 can control the steering and speed of sled 10.

Figure 12:
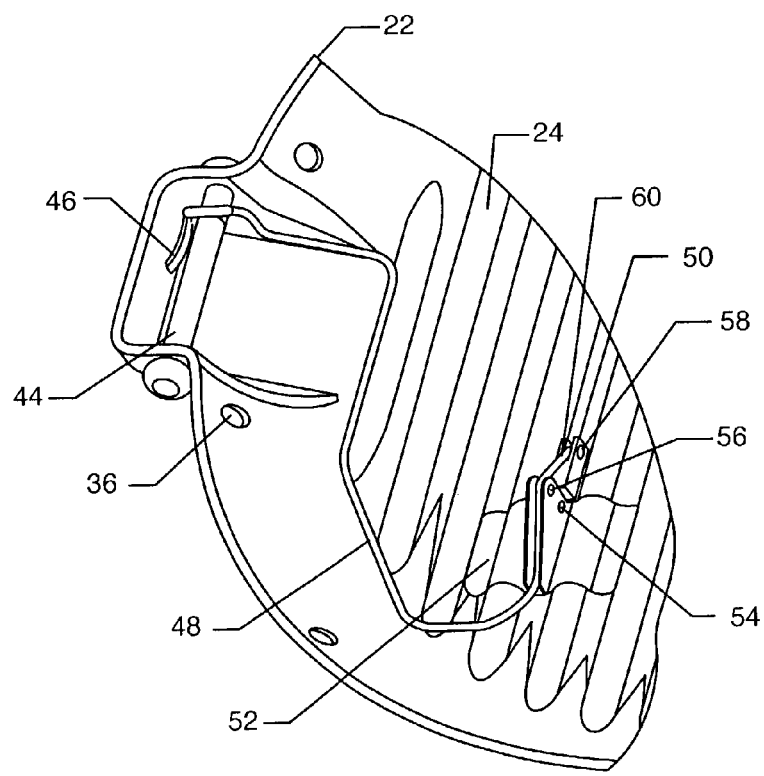
FIG. 12 illustrates a detail taken at circle 12 in FIG. 9 of the mounting of a steering/braking paddle to the sliding pan of the present invention.

As illustrated in FIGS. 9 and 12, pivot mount 50 is fastened to the inside of sliding pan 22, one pivot mount 50 for each of the right and left sides. Pivot mount 50 has a hole in which is inserted pivot pin 54. Extension spring 60 connects at the top of the bellcrank portion of paddle 52 by means of retainer pin 58 in mount 50. Spring 60 automatically returns paddle 52 to its stowed position when passenger 64 releases pressure from lever 46. One end of cable 48 connects to lever 46. The other end of cable 48 connects to pin 56, which is the same pin that spring 60 is connected to. Lever 46 is fastened to handle 44.

When passenger 64 wishes to steer sled 10 to the right, he or she applies gripping pressure to control lever 46 located on the right side of body 12. Right and left sides in this discussion are taken from the passenger's perspective, which is facing forward along the path of travel. The application of gripping pressure to control lever 46 on the right side of body 12 pulls on the bellcrank portion of paddle 52, causing it to extend below bottom face 26 of sliding pan 22 while pivoting on pin 54. In this extended position, paddle 52 causes a drag force to be applied to the right side of sled 10, which causes sled 10 to turn towards the right. The degree to which sled 10 turns depends on how long passenger 64 applies the gripping force; the longer the application of the gripping force, the greater the turn. To stop further turning, passenger 64 releases control lever 46, which in turn causes return spring 60 to pull paddle 52 back to the stowed position in the bottom of pan 22. To produce a left turn, passenger 64 uses control lever 46 located on the left side of body 12. Through the use of control levers 46 on the right and left sides of body 12, passenger 64 can maneuver sled 10 along whatever path he or she chooses, thus adding greatly to the ride experience.

Slowing and stopping sled 10 can also be accomplished through the simultaneous operation of control levers 46. To reduce the speed of sled 10 during a ride, passenger 64 applies gripping pressure equally to both the right and left side control levers 46 to cause paddles 52 to extend and apply drag forces. Because the drag force is distributed equally to both right and left sides of sled 10, the simultaneous application of gripping pressure to control levers 46 will cause sled 10 to slow while continuing along its ride path. Continuous application of gripping pressure to control levers 46 will gradually slow sled 10 to a stop. By being able to adjust the speed of sled 10 during the ride, passenger 64 is able to enhance his or her ride experience while also being provided with a safer ride.

The foregoing descriptions of the exemplary embodiments of the present invention have been presented for purposes of enablement, illustration, and description. It is not intended to be exhaustive of or to limit the present invention to the precise forms discussed. There are, however, other configurations for recreational sliding devices not specifically described herein, but with which the present invention is applicable. The present invention should therefore not be seen as limited to the particular embodiments described herein; rather, it should be understood that the present invention has wide applicability with respect to recreational sliding devices. Such other configurations can be achieved by those skilled in the art in view of the description herein. Accordingly, the scope of the invention is defined by the following claims.

What is claimed is:

1. A steerable sliding recreational device comprising:
   a body having a top surface and a bottom surface and an outer perimeter configured to form a passenger occupancy area;
   a sliding pan having opposed top and bottom faces, said top face attached to said bottom surface of the body;
   a seating platform attached to said top surface of the body;
   a cushioning pad disposed between said seating platform and said sliding pan;
   at least two handles mounted on said body; and
   a steering mechanism movable between a stowed position and a deployed position, said steering mechanism comprising:
      a control lever mounted adjacent to each of said handles;
      a cable connected to each of said control levers extending along said top face; and
      at least two steering paddles mounted to said sliding pan, each paddle operably connected to one of said cables;
      whereby, through activation of any of said paddles, the device may be steered by a person riding it.

2. The device according to claim 1 wherein simultaneous activation of all of said paddles enables braking of the device by a person riding it.

3. A steerable sliding recreational device comprising:
   a body having a top surface and a bottom surface and an outer perimeter configured to form an opening through the body and forming a passenger occupancy area;
   a sliding pan having opposed top and bottom faces, said top face attached to said bottom surface of the body;
   a seating platform attached to said top surface of the body;
   a cushioning pad disposed between said seating platform and said sliding pan;
   at least two handles mounted on said body; and a steering mechanism movable between a stowed position and a deployed position, wherein said steering mechanism comprises:
      a control lever mounted adjacent to each of said handles;
      a cable connected to each of said control levers extending along said lower face; and
      at least two steering paddles mounted to said sliding pan, each paddle operably connected to one of said cables;
      whereby, through activation of any of said paddles, the device may be steered by a person riding it.

4. The device according to claim 3 wherein simultaneous activation of all of said paddles enables braking of the device by a person riding it.

5. A steerable sliding recreational device comprising:
   an annular-shaped body having a top surface and a bottom surface and an outer perimeter configured to form a passenger occupancy area;
   a sliding pan having opposed top and bottom faces, said top face attached to said bottom surface of the body;
   a seating platform attached to said top surface of the body;
   a cushioning pad disposed between said seating platform and said sliding pan;
   at least two handles mounted on said body, and a steering mechanism movable between a stowed position and a deployed position. wherein said steering mechanism comprises:
      a control lever mounted adjacent to each of said handles;
      a cable connected to each of said control levers extending along said upper face; and
      at least two steering paddles mounted to said sliding pan, each paddle operably connected to one of said cables;
      whereby, through activation of any of said paddles, the device may be steered by a person riding it.

6. The device according to claim 5 wherein simultaneous activation of all of said paddles enables braking of the device by a person riding it.

* * * * *